United States Patent [19]

Masuda

[11] 3,930,601

[45] Jan. 6, 1976

[54] SHEET MATERIAL PIN FEED TRACTOR MECHANISM

[75] Inventor: Yoshihisa Masuda, Komaki, Japan

[73] Assignee: Centronics Data Computer Corporation, Hudson, N.H.

[22] Filed: Nov. 22, 1974

[21] Appl. No.: 526,372

[52] U.S. Cl. .......... 226/74

[51] Int. Cl.² .......... G03B 1/30

[58] Field of Search .......... 226/74, 75, 170–173

[56] References Cited

UNITED STATES PATENTS

| | | | |
|---|---|---|---|
| 2,179,156 | 11/1939 | Mabon | 226/75 |
| 3,606,122 | 9/1971 | Brewster et al. | 226/74 |
| 3,687,347 | 8/1972 | Rod | 226/74 |

*Primary Examiner*—Allen N. Knowles
*Attorney, Agent, or Firm*—Ostrolenk, Faber, Gerb & Soffen

[57] ABSTRACT

A drive for advancing paper or other sheet material through a printing station, or the like, including: a toothed, flexible belt carrying spaced pins for engaging the sheet material, the belt having a respective drive sprocket engaging tooth for each pin; a drive sprocket with which the belt teeth are engaged and including grooves for receiving and engaging the belt teeth; a stationsry idler guide cooperating with the drive sprocket for tensioning and guiding the belt. The support frames for the pins on the belt are designed to prevent the pins from twisting during paper and feed operations. A linear guide serves to maintain the pins in alignment; a mounting means clamps the drive sprocket to a drive shaft without play therebetween.

23 Claims, 9 Drawing Figures

SHEET MATERIAL PIN FEED TRACTOR MECHANISM

BACKGROUND OF THE INVENTION

Various mechanisms are known for moving sheet material, such as paper, or the like, which material is imprinted at a printing station or is otherwise acted upon. Previous mechanisms have included pin type feed devices, which include pins carried on an endless chain or belt, with the belt being driven by an appropriate drive sprocket. The pins move into apertures in the paper for positive advancement thereof. An example of such a mechanism appears in U.S. Pat. No. 3,507,431. Through experience with the mechanism taught in the aforesaid patent and with other prior art mechanisms, a number of problems have arisen.

The pins secured to an endless belt are subject to shifting longitudinally in the plane of the belt, and/or to shifting out of the plane of the belt as the pins move the sheet material. Such misalignment of the pins tend to cause the sheet material to tear or separate from the pins or to cause improper orientation of the sheet material resulting in misaligned imprinting. Furthermore, prior art mechanisms often do not provide positive guidance and support for the belt carrying the pins during the sheet material engaging pathway; which contributes to the aforesaid undesired motion of the pins. Further still, the prior art has not provided adequate means for adjusting a plurality of tractor mechanisms with respect to each other for various width sheet materials. Further still, the prior art has required a driven sprocket and an idler sprocket for cooperating with the endless belt which carries the pins. Adjustment of the spacing between the sprockets or otherwise ensuring proper tensioning of the pin carrying belt has proven quite difficult where two rotated sprockets are involved. Furthermore, with two round, spaced apart sprockets, there is not adequate guidance and support for the pin carrying belt over its full pathway. Additionally, it has been found that there has been undesired play between the means which drives the drive sprocket for the pin carrying belt and the sprocket itself. This has caused improper positioning of the sheet material at a printing station, or the like, which has introduced undesired errors in the location of the imprinting on the sheet material.

Although previous tractor mechanisms are capable to move sheet material as desired, the above noted drawbacks have resulted in the development of the present invention.

SUMMARY OF THE INVENTION

The present invention relates to a pin feed tractor mechanism for moving perforated sheet material. Typically, the sheet material is perforated at spaced intervals, usually along each side of the sheet. The tractor mechanism supports means that moves pins which enter into the perforations provide positive drive for the sheet material. The pins are carried by an endless belt and project outwardly of the belt. The inner surface of the belt is provided with a plurality of teeth, each tooth being engaged by a pin assembly. The belt passes around a rotatable drive sprocket that is provided with a plurality of spaced grooves for receiving the pin assemblies secured to on the belt teeth.

Cooperating with the belt and defining the remainder of its pathway is an adjustable positionable, stationary idler having a track about its periphery for guiding and aligning the belt. The idler is longitudinally adjustable to tension the belt sprocket. The idler has a curved end, and a pair of straight side surfaces extending toward the drive sprocket. The track lies along the periphery of the molding and extends along the entire length of the molding. The molding and drive sprocket together define a supporting guide pathway for the belt. The molding and drive sprocket support the belt and thus the pins carried thereon and prevent the pins from moving out of the perforations in the sheet material when in the feed region.

Each pin is integrally joined to a respective frame which is secured to the belt by a pin frame fastening element. The curved outer surface of each pin frame is engaged by a similarly curved slot in the drive sprocket. The width of each pin supporting frame lengthwise of the belt is selected so that during the portion of the pathway of the belt when the pins are engaged in the perforations of the sheet material, the end edges of neighboring pin supporting frames abut, to collectively prevent the frames from twisting longitudinally, effectively in the plane of the belt thereby retaining all pins at the proper orientation and spacing.

Means are provided to engage each pin frame as its pin operatively engages the sheet material to press the pin frames against the aforesaid idler molding to prevent movement of the pins in a direction transverse of the belt as the pins that are then passing through the perforations of the sheet material move the sheet material.

The motor driven shaft which drives the sprocket and passes therethrough, the shaft is appropriately shaped, e.g. desirably polygonally, and most preferably square in cross-section. Plural (preferably two) clamping members each having an internal surface profile conforming to a position of the external profile of the drive shaft are provided with enlarged openings for receiving threaded fasteners which the clamping members to the drive shaft thereby eliminating any play between the drive sprocket and the drive shaft.

A number of other features and advantages of the tractor mechanism according to the present invention appear in the detailed description below.

Accordingly, it is a primary object of the present invention to provide an improved pin feed type tractor mechanism for sheet material, or the like.

It is a further object of the invention to provide appropriate means for guiding the pins of such mechanism as they are engaging the sheet material they are moving.

It is another object of the invention to provide such a mechanism which precludes longitudinal shifting of the pins while they are moving the sheet material.

It is another object of the invention to provide such a mechanism which includes means for preventing transverse shifting of the pins as they are moving the sheet material.

It is another object of the invention to provide such a mechanism which has an improved means for tensioning the pin carrying belt.

It is another object of the invention to provide such a mechanism which reduces the number of teeth required on the pin carrying belt.

These and other objects will become apparent from the following description of the accompanying drawings.

BRIEF DESCRIPTION OF THE DRAWINGS

FIG. 1 is a schematic, elevational view of apparatus employing pin feed tractor mechanisms according to the invention for moving a sheet of material to be imprinted, or the like;

DETAILED DESCRIPTION OF THE INVENTION

Figure 1:
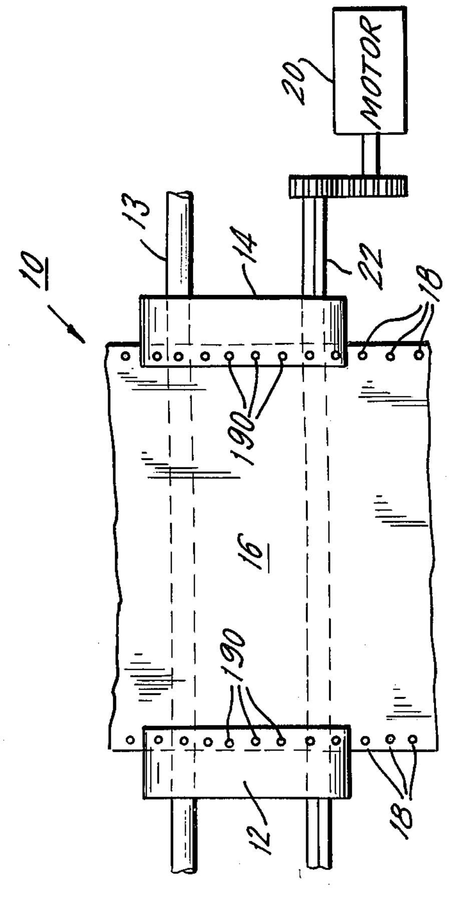

Referring to FIG. 1, apparatus 10, which typically is employed as a paper feed for line printers and the like, comprises a left-hand tractor 12 and right-hand tractor 14, both of which are designed in accordance with the invention. At their upper ends, tractors 12, 14 are supported by a stationary support shaft 13 and at their lower ends they are supported by rotatable drive shaft 22. Sheet material, paper, or the like 16 is advanced by tractors 12, 14 to perform line feed or other similar paper advancing operations. The side edges of sheet 16 are provided with spaced perforations 18 which cooperate with and receive the pins of the tractor in accordance with the invention so as to cause sheet 16 to be moved by the tractors.

Motor 20 is coupled through conventional drive means, to rotate drive shaft 22 which is connected by means described below with the pins of the tractor, so as to drive the pins and move the paper or sheet material as desired. Guide shaft 13 supports the upper ends of tractors 12, 14 and cooperates with shaft 22 to provide for adjustable alignment of the assemblies 12 and 14 to accommodate paper of varying width.

The spacing between the tractors is adjusted so that left and right hand feed pins 190 are aligned with the left and right hand apertures 18. Adjustment of the tractors is accomplished by means described below.

Since tractors 12, 14 are mirror images, only one of the tractors will be described herein for purposes of brevity.

Turning to FIGS. 2–5, tractor 30 shown therein is comprised of frame element 32, which is slightly longer than the length of the path of timing belt 152 and which is slightly wider than the width of drive gear 70 over which timing belt 152 passes. The curved upper and lower ends, 34 and 36 of frame element 32, extend around the timing belt.

Centrally located on frame element 32 and projecting forwardly thereof is rigid support projection 38 for the idler molding 50.

Frame element 32 further includes upper opening 42 therethrough for receiving cooperating support bushing 132 which slidably receives the tractor guide shaft 13. Frame element 32 also includes lower opening 44 for receiving the drive gear support bushing 76 and bearing 90, as described below.

Frame projection 38 has a pair of bores 46 for receiving the fastening means 136 which secure frame element 32 to member 130.

An idler molding 50 (see FIGS. 2, 3 and 6) is positioned adjacent member 32. Molding 50 is bifurcated to define legs 52, 54 and central slot 56. The legs straddle and rest against the opposing exterior surface of oval-shaped projection 32. Slot 56 is dimensioned so that projection 38 nests securely against the side walls of slot 56 and so that the projection nests against the inner end of slot 56 when molding 50 is fully descended against projection 38. In order to tension timing belt 152, molding 50 is vertically shiftable with respect to frame 32 and projection 38. The projection serves as a guide for this vertical shifting to prevent rocking of the molding and to maintain it in the proper orientation at all times. Legs 52, 54 extend downwardly with their free ends 55 adjacent drive sprocket 70. The shape of molding 50 with its elongated legs 52, 54 ensures that below described track 60 extends toward and practically into contact with drive sprocket 70. As a result, timing belt 152 and pins 190 carried thereon are positively supported and will not displace inwardly toward the longitudinal axis of frame 32, and the belt is supported against sliding sideways off molding 50 by the elongated track 60.

Figure 3:
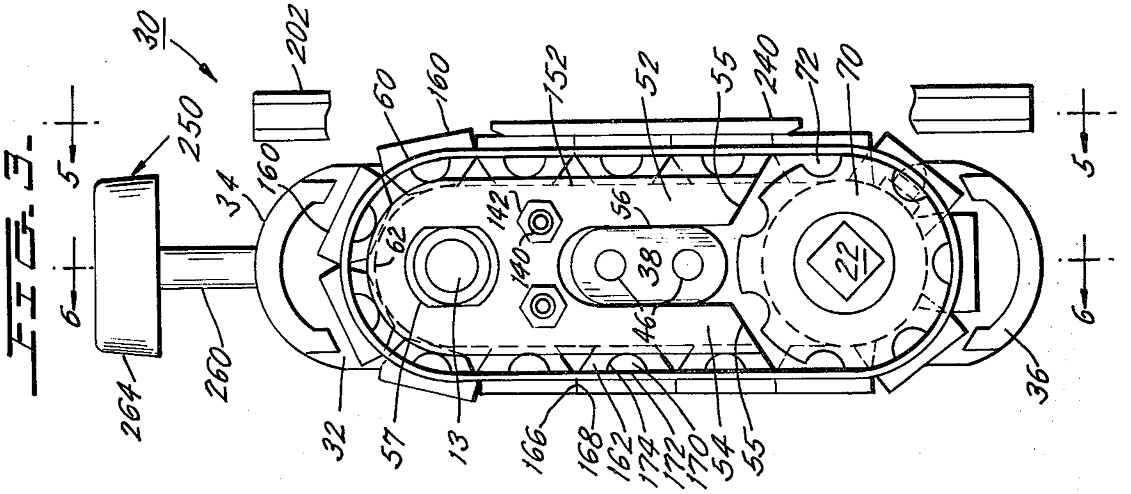
FIG. 3 is an elevational view along the line and in the direction of arrows 3, 3 in FIG. 6.

Guide shaft 13 (see FIGS. 1, 5 and 6) extends through the clearance opening 57 in molding 50. As shown in FIG. 3, however, while opening 57 has a width that closely approximates the outer diameter of sleeve 132 which receives shaft 13, thereby prohibiting sideways rocking of molding 50, there is clearance in opening 57 above and below sleeve 132 for permitting the above mentioned vertical shifting of molding 50 to provide the desired tension for timing belt 152.

Clearance openings 58 provided in molding 50 are aligned with elongated openings 138 in tractor frame element 130. Bolts 144 pass through openings 138 in frame element 130 and 58 in molding 50 and threadedly engage nuts 142 arranged in recesses 138*a* (see FIG. 6) to secure molding 50 to frame 130. Elongated slots 138 allow for adjustment of molding 50 relative to frame 130 to provide the proper tension for the timing belt.

The periphery of molding 50 has a raised track 60 of uniform width. Track 60 serves as the guide for timing belt 152 as it slides over the molding. The curved end section 62 of track 60 serves as the upper end guide for the timing belt.

As will become apparent below, the pin frames mounted timing belt 152 slide along track 60. The track, and for simplest manufacture the entire molding, is comprised of a relatively low friction material, such as polytetrafluoroethylene over which the timing belt can easily slide with minimum friction and which material is sufficiently hard and durable for long term use.

Turning to FIGS. 2, 3, 6 and 9, the lower end of timing belt 150 is guided and supported on drive sprocket 70. Around the annular periphery of sprocket 70 are a plurality of curved notches 72, which are spaced apart precisely the spacing distance of the cooperating driven teeth 170 on timing belt 152. In a further feature of the present invention, each of the cooperating teeth 170 on the timing belt is associated with and is connected with and may even be part of a respective pin 190 that is carried on the timing belt. There are no extra teeth on the timing belt and no extra notches in the sprocket 70 between adjacent pins 190. The diameter of sprocket 70 is coordinated with the dimensions of molding 50 and its track 60 so that the timing belt follows a straight line path along its sides.

Figure 9:
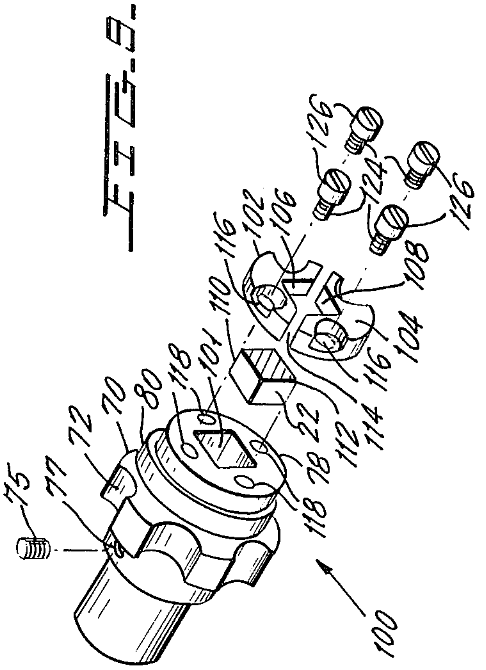
FIG. 9 is an exploded perspective view of the drive shaft for the tractor mechanism and the means for joining the drive shaft to the pin feed timing belt.

Turning to FIGS. 1 and 9, sprocket 70 has an opening 74 therethrough for receiving its support bushing 76. Fixedly secured at the forward end of bushing 76 is the drive gear securement flange 78.

Figure 6:
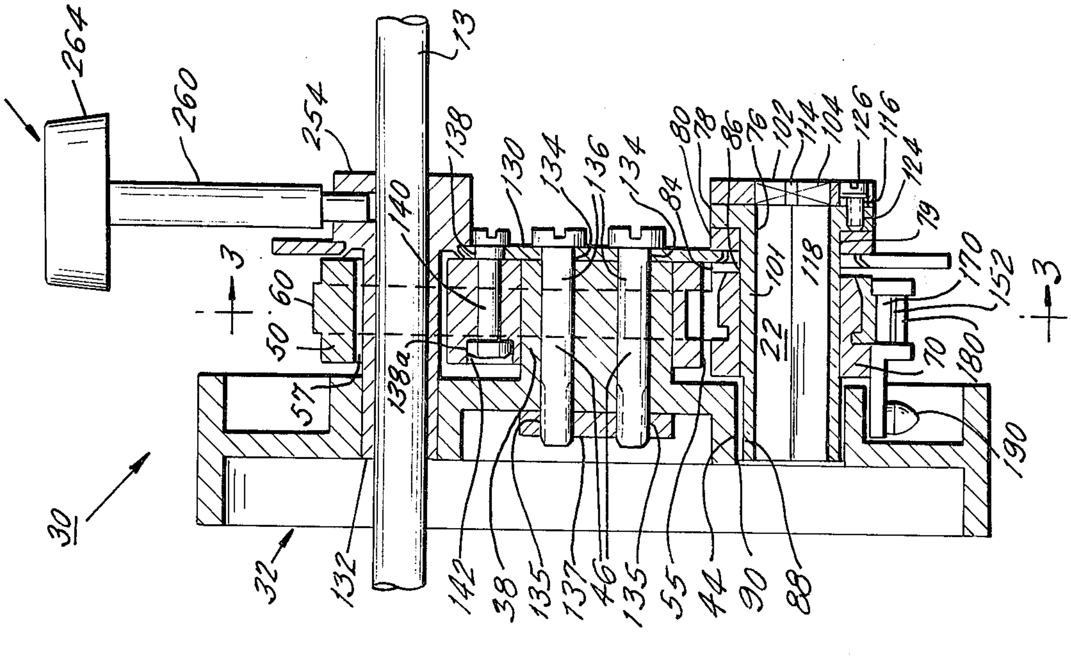
FIG. 6 is a cross-sectional view through the tractor mechanism of FIG. 3 along the line and in the direction of arrows 6, 6 of FIG. 3.

Turning to FIGS. 6 and 9, sprocket 70 is held in position on bushing 76 by set screw 75, which passes through radially aligned tapped opening 77 in flange portion 70*a* of sprocket 70 and extends into engagement with bushing 76. In this manner, the axial position of sprocket 70 along bushing 76 is fixed and, in appropriate circumstances, is adjustable. Furthermore, as described below, since sprocket 70 is on one side of frame element 130 and flange 78 is on the side of frame element 130 and flange 78 is on the other side, it is necessary that sprocket 70 be slidable onto and off bushing 76 to facilitate assembly of the tractor.

Figure 2:
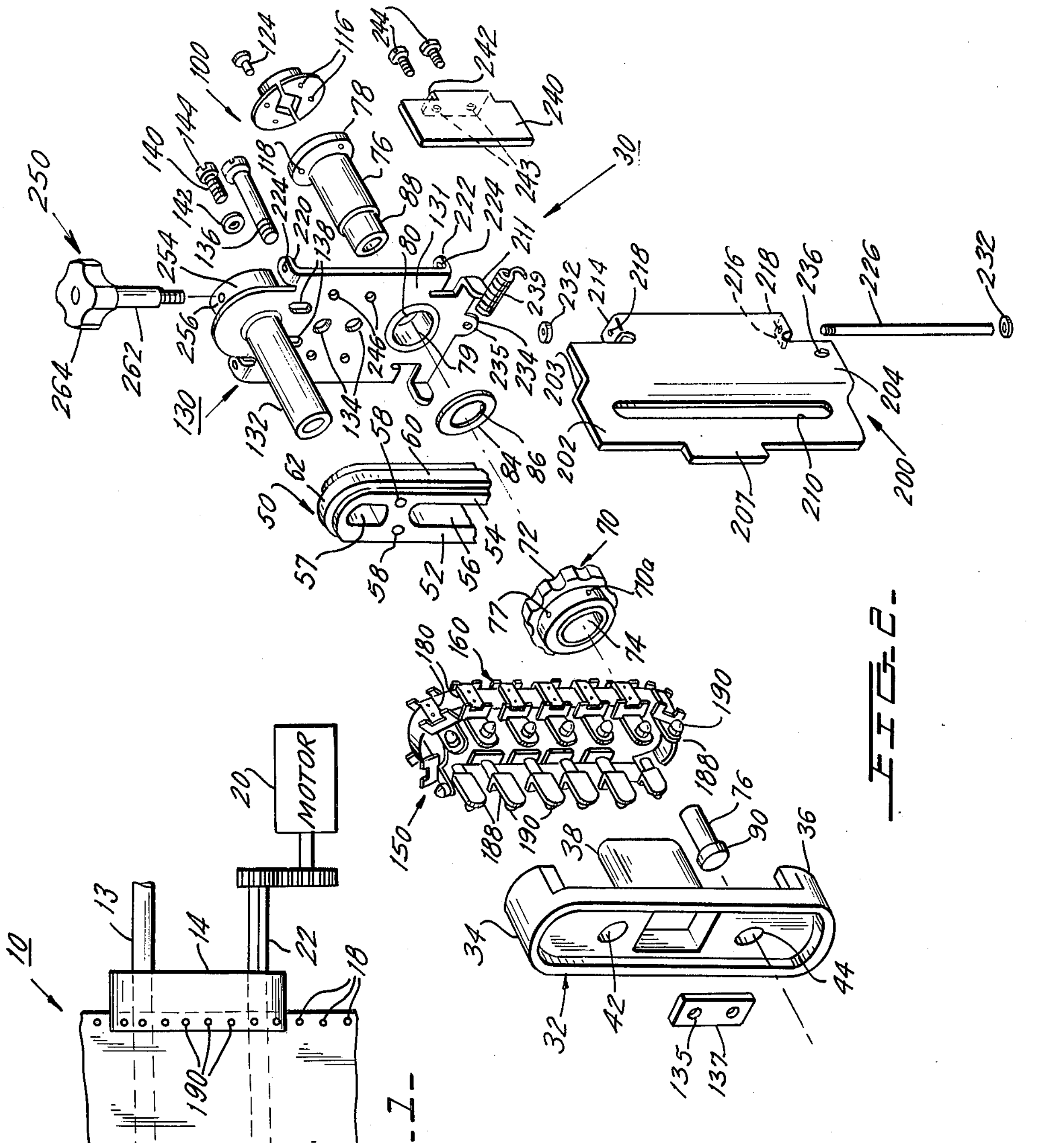
FIG. 2 is an exploded perspective view of a right-hand pin feed tractor mechanism according to the invention.

Turning to FIGS. 2 and 6, bushing 76 extends through opening 79 in the forwardly projecting annular flange 80 of frame element 130. Bushing flange 78 abuts the forward side of flange 80. A washer 84 having a central opening 86, receives bushing 76 and is positioned between sprocket 70 and frame element 130.

The narrow rearward end portion 88 of bushing 76 extends into opening 44 through frame element 32. A sleeve bearing 90 is press fit or otherwise securely seated in opening 44 and bushing rear portion 88 freely rotates in receiving bearing 90 and is supported in position there against radially directed torque forces on drive shaft 22.

Drive shaft 22 is driven from motor 20 through appropriate connecting gearing and shaft 22 in turn rotates sprocket 70. Sprocket 70 is mechanically coupled to shaft 22 through bushing 76, flange 78 and clamping means 100.

Turning to FIGS. 3, 6 and 9 in the preferred arrangement, shaft 22 is polygonal in cross-section with the preferred square cross-section being illustrated. Other appropriate polygonal or splined cross-sections may be selected. Opening 101 extending completely through bushing 76 conforms to the shape of shaft 22. Normally, a certain amount of play is encountered between bushing 76 and shaft 22.

Figure 4:
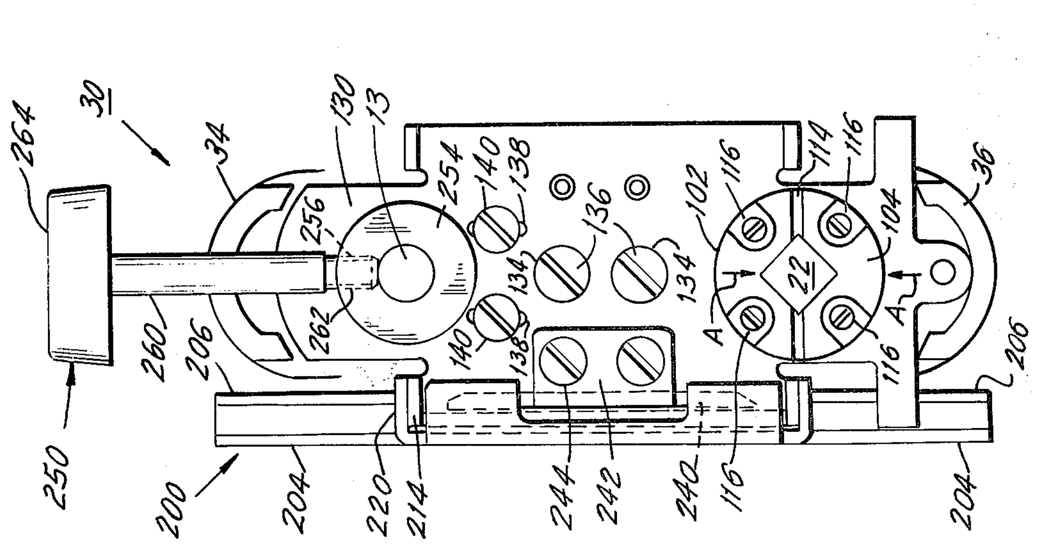
FIG. 4 is a rear elevational view of the tractor mechanism of FIG. 3 taken along the line and in the direction of arrows 4, 4 in FIG. 5.

To ensure positive connection between sprocket 70 and shaft 22 without any play or relative motion between these elements, shaft clamping means 100 is used to clamp sprocket 70 to shaft 22. As shown in FIGS. 2, 4, 6 and 9, clamping means 100 comprises separate clamp pieces 102, 104 which are each in the shape of a part of a circle and which have respective right-angle V-notches 106, 108 formed therein, so as to define openings to each receive a pair of adjacent sides of shaft 22, whereby respective corners 110, 112 of shaft 22 are aligned in the apices of the notches 106 and 108 of clamping pieces 102, 104. The depths of notches 106, 108 are selected so that, as shown in FIG. 4, when the clamping pieces are moved together in the direction of arrows A, A (FIG. 4), there is still a short gap 114 between them, to snugly embrace shaft 22.

Clamping pieces 102, 104 are each provided with a pair of clearance openings 116, which are arranged at equally spaced intervals around the assembled clamping pieces in FIG. 9. Above described bushing flange 78 is provided with receiving openings 118, which are cooperatively aligned with and radially similarly located as openings 116 and which are also uniformly spaced around flange 78. Openings 118 are tapped to threadedly engage screws 124, to secure clamping pieces 102, 104 to flange 78. As shown in FIG. 6, the diameters of clearance openings 116 are greater than the outer diameters of the threads on screws 124 but less than the diameters of the screw heads 126. Once screws 124 are inserted into and through the aligned openings and before the screws are tightened inward, radial pressure is applied to clamping pieces 102, 104 to force them securely together against shaft 22. Heads 126 of tightened screws 124 securely engage clamping pieces 102, 104 and prevent them from moving apart. This tight securement ensures that rotation of shaft 22 will cause corresponding rotation of gear 70 without any play therebetween.

Turning to FIGS. 2, 4 and 6, cooperating with frame element 32 is separate frame element 130. Frame element 130 includes plate 131. Plate 131 carries above described forwardly projecting hollow flange 80. Frame element 130 also includes bushing 132 for receiving tractor mechanism upper support rod 13. Bushing 132 passes in the above described manner through vertically elongated, horizontally confined opening 57 in idler molding 50 and extends into opening 42 in frame element 32.

Openings 134 through plate 131 receive fastening screws 136 which extend through openings 46 through projection 38 and engage in tapped, threaded openings 135 in plate 137, thereby holding frame elements 32, 130 securely together.

Frame element plate 131 further includes vertically elongated openings 138 which receive the fastening screws 140. Screws 140 further pass through openings 58 in molding 50 and threadedly engage nuts 142 to which they are tightened by heads 144. Openings 138 are elongated vertically with respect to openings 58 to permit the desired vertical shifting of molding 50 for tightening the timing belt, as described below.

Turning to FIG. 2, drive sprocket 70 and track 60 support and guide the motion of pins 190 of the timing belt mechanism 150. Turning to FIGS. 2, 3, 5 and 7, mechanism 150 includes a closed loop belt 152 that is flexible, yet non-expansible, and that is comprised of a sturdy plastic or the like material which will not deteriorate through prolonged use. The length of belt 152 is selected to coordinate with the total length of the pathway defined by track 60 and sprocket 70.

Affixed in position on belt 152 are a plurality of adjacent pin assemblies 160. Each pin assembly is comprised of a rigid frame, which includes upstanding flanges 162, 164 which are separated by the width of belt 152 by bridging member 170, such that the belt holds each pin assembly 160 at a desired orientation in the plane of the belt to prevent the pin mechanisms 160 from swiveling in this plane in the directions of arrows 172 as might occur when pins 190 engage sheet 16 being moved by the moving pins. Each flange 162, 164 extends outwardly from both sides of bridging member 170 along belt 152. To eliminate twisting in the directions of arrows 172 during use, the width of each frame between its ends 166, 168 is selected so that, as shown in FIG. 3, adjacent ends 166, 168 of neighboring pin assemblies abut during travel along the straight portion of the pathway of movement of belt 152, which is the operative portion of the pathway. The tendency of one pin assembly frame to swivel will be blocked by its abutment against the neighboring pin assembly frame.

Figure 8:
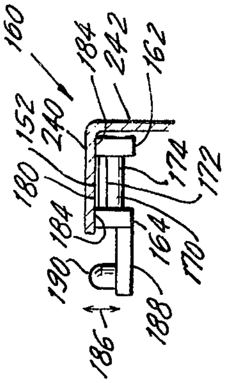
FIG. 8 is a cross-sectional view along the line and in the direction of arrows 8, 8 in FIG. 7 showing the manner of mounting of pins to the timing belt and means for supporting the timing belt in position.

Referring to FIGS. 3 and 8, the upper surface 172 of crossbar 170 is grooved to conform to and receive a tooth of timing belt 152. The lower surface 174 of crossbar 170 si curved and conforms to the grooves 72 in drive sprocket 70.

Figure 7:
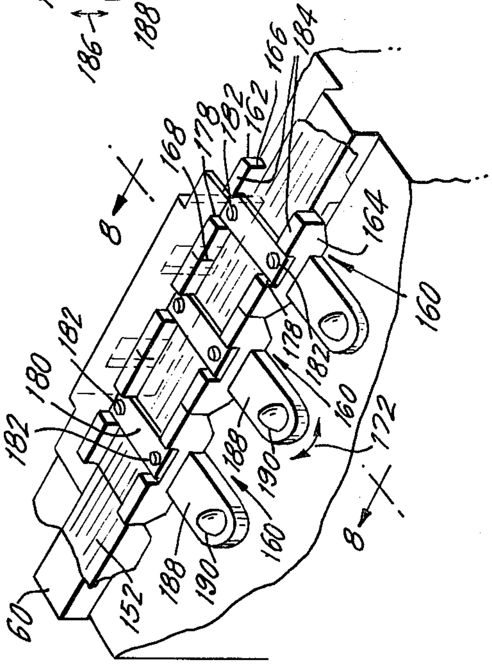
FIG. 7 is a fragmentary, perspective view of the timing belt and pins of the pin feed tractor mechanism according to the previous Figures showing the mounting of the pins upon the timing belt.

Referring to FIGS. 7 and 8, strap 180 extends across each set of pin frame assembly flanges 162, 164 above the outer surface of belt 152 and is located in appropriate receiving slots 178 in each set of pin frame assembly flanges 162, 164. Each slot 178 has a pin-like projection 182 which force fittingly receive strap 180. The depth of groove 178 is chosen so that strap 180 will clamp securely against belt 152 and squeeze the belt between the plate 180 and outer surface 172 of crossbar 170. In this manner, each pin assembly 160 is fixedly positioned along and is secured to belt 152. The upper surface 184 of flanges 162, 164 cooperate with plate 240 for preventing the raising of pin assemblies 160 off the molding 50 and its track 60 in the direction of arrows 186.

Although frame flanges 162, 164 are relatively wide along the length dimension of belt 152, they engage belt 152 only along the relatively thinner width surfaces of surface 174 and clamping element 180, whereby belt 152 is able to make the relatively narrow radius turns at end 62 of molding 50 and at sprocket 70, as shown in FIG. 3.

Referring to FIGS. 1, 2, 5, 7 and 8, projecting out of each pin frame assembly element 164 is a respective pin supporting tongue 188, which supports a respective outwardly projecting pin 190. Each pin 190 is adapted to move into a perforation 18 in sheet 16. One significant aspect of the present arrangement, as compared with the prior art, is that there is one crossbar and timing belt tooth 170 for each pin 190 and in the preferred embodiment there are no additional belt teeth, like 170, engaging sprocket 70.

Flexible belt 152 must be drawn tightly against sprocket 70 and track 60 in order for the tractor 30 to operate properly. For this purpose, as described above, openings 138 are vertically elongated which permits molding 50 to be moved toward or away from gear 70 for adjusting belt 152.

Figure 5:
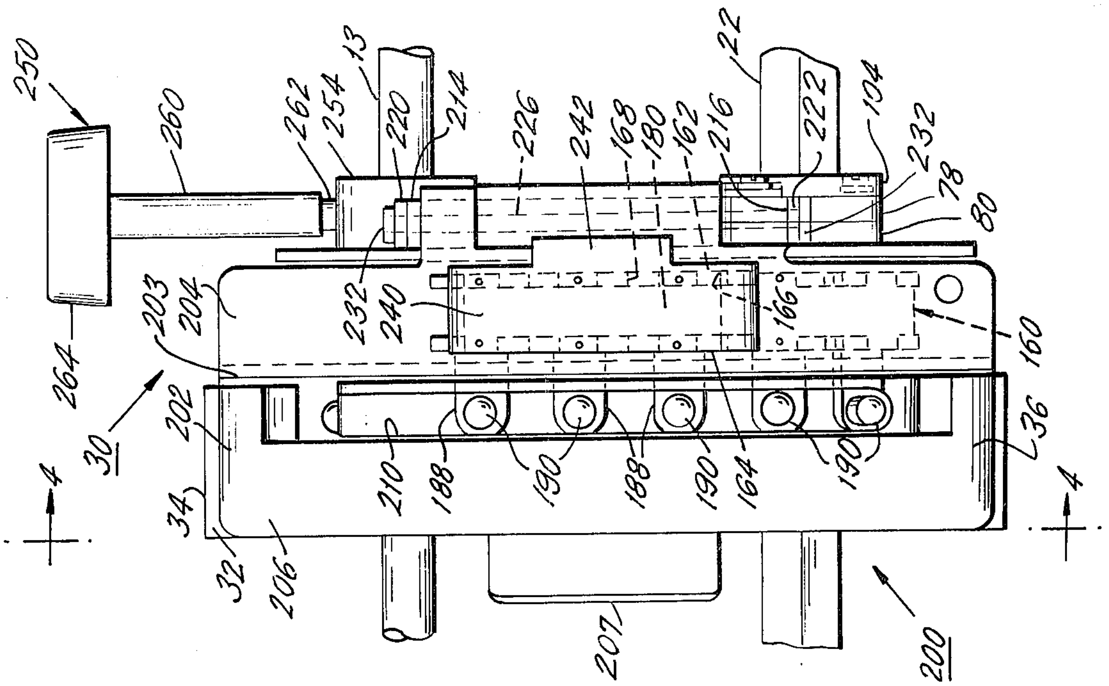
FIG. 5 is a side elevational view of the tractor mechanism in FIG. 3 looking in the direction of arrows 5, 5 of FIG. 3.

FIGS. 2, 4 and 5 show swingable door assembly 200 which includes substantially Z-shaped door 202, having spaced parallel panels 202 and 204 joined by intermediate section 203. Panel 204 has a pair of flanges 214 and 216 with openings 218 for receiving elongated rod 226 which also extends through openings 224 in flanges 220 and 222 on frame 130. Panel 202 when closed, presses sheet 16 over pins 190. Elongated slot 210 is defined in door panel 202 and pins 190 are sufficiently elongated to project through slot 210, whereby sheet 16 is kept from lifting off pins 190 by door panel 202.

Handle portion 207 may be gripped to move door 200 between an open position (not shown), wherein free access to belt 152, pins 190 and sheet 16 can be obtained, and a closed position shown in FIGS. 4 and 5, wherein panel 206 holds sheet 16 over pins 190. The closed position of door 202 is defined by its panel 204 abutting stop flange 211 on frame element plate 131. The height spacing between hinge flanges 214, 216 is selected to be nearly the full height of door 202, which minimizes the adverse effect of any torque forces applied to the door by spring 240. As shown in FIG. 5, the respective upper hinge flanges 214, 220 are adjacent each other as are the respective lower hinge flanges 216, 222. Passing through aligned upper and lower hinge pin openings 224, 218 is hinge pin 226, which permits the opening and closing pivoting of door 202. Conventional lock washers 232, or the like, hold pin 226 in position.

An over-center spring arrangement is provided for selectively biasing door 202 opened or closed. Frame element plate 131 includes a depending flange 234, which with respect to the front of the tractor, is rearward of pivot pin 226. An opening 235 is provided in lug 234. In door panel 206 is a receiving opening 236. Helical biasing spring 239 has its ends hooked openings 235 and 236. The positions of openings 235 and 236 with respect to pin 226 causes door 202 to be normally biased either closed or opened by spring 239.

Turning to FIGS. 2, 4, 5, 7 and 8, additional means are provided for preventing motion of pins 190 in the directions of arrows 186 during travel of pins 190 along the operative path of movement of the pins past slot 210 while the pins are moving sheet 16. Pin assembly holding plate 240 is fastened by means of its integral flange 242 through fasteners 244 passing through clearance openings 243 in plate 242 and then into receiving openings 246 in frame element plate 131. Openings 243 in back plate 242 are aligned with openings 246 in plate 131 so that, as shown in FIG. 8, plate 240 engages the outer edge surfaces 184 of all of the pin assemblies 160 as they move along slot 210. This prevents pins 190 from shifting either inwardly or outwardly in the direction of arrows 186 in FIG. 8.

Turning to FIG. 1, as was noted above, tractors 12 and 14 are adjustable toward or away from each other along upper shaft 13 and lower drive shaft 22 to accommodate sheets of different width. Clamping means 100 for securing sprocket 70 to drive shaft 22 has been discussed. The positioning of sprocket 70 effectively positions tractor 30. However, this does not positively position the frame of the tractor. For such positive positioning, fastening means 250 is provided. As shown in FIG. 6, shaft 13 extends through guide shaft support upper sleeve 132. At the forward side of frame element 130 is the widened annular securement housing 254 which is an extension of sleeve 132. Within housing 254 is a radially oriented tapped opening 256. Fastening means 250 includes screw member 260 which has a threaded end portion 262 threadedly engaging opening 256. As shown in FIG. 4, screw 260 is tightened by handle 264 to lock against shaft 13 to position the entire tractor along shaft 13.

There has just been described a novel pin type tractor mechanism for advancing sheet material or the like, which mechanism includes: individual feed pins secured on a belt; means, including a shaped molding for guiding and supporting the feed pins and hence the belt, and which is arranged and shaped to provide support for virtually the entire linear run of the belt; each pin being carried on a pin support mechanism which abuts an adjacent pin support mechanism so as to protect against longitudinal shifting of the pin mechanisms in the plane of the pin mechanisms; a guide plate for retaining each of the pin assemblies in position against shifting toward and away from the guide support means of the tractor mechanism; a novel arrangement for securing the drive gear of the belt for the pins to the drive shaft to eliminate play between the drive shaft and the belt; and a number of other features which have been considered in greater detail above.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A tractor mechanism for advancing sheet material that has spaced apertures therealong; said mechanism comprising:

a. a supporting frame;

b. a drive sprocket having a plurality of grooves along the periphery thereof; a drive shaft on which said sprocket is mounted and which rotates said sprocket; said shaft being supported on said frame, thereby supporting said sprocket with respect to said frame;

c. a stationary, substantially U-shaped idler means; means on said frame supporting said idler means; the peripheral surface of said idler means and said sprocket defining an oval-shaped guide path;

d. closed loop belt means entrained around said sprocket periphery and said idler means peripheral edge and being supported by and guided for motion around said sprocket and said idler means; said belt means spaced teeth;

e. a plurality of pin feed assemblies secured to and arrayed along each tooth of said belt means and having pin tabs that project to one side of said belt means, each pin tab having an upwardly extending feed pin for engaging the perforations in the sheet material;

f. each of said assemblies having sprocket engaging elements on the tooth side of said belt selectively receivable by the sprocket grooves along said sprocket periphery, for rotating said belt and pin feed assemblies.

2. The tractor mechanism of claim 1, further comprising:

a guide track on said idler means peripheral edge; said pin assemblies being shaped to slidably engage said guide track, to maintain alignment of said belt and pin feed assemblies.

3. The tractor mechanism of claim 2, wherein said pin feed assemblies are each further comprised of:

a first upstanding flange extending along one side edge of said belt means and including a second upstanding flange extending along the opposite side edge of said belt means;

a joining rib spanning between said flanges and adapted to engage a tooth along one surface and a sprocket groove along the opposite surface;

said first and said second flanges having opposite ends that face toward the flange ends of the adjacent assemblies; said first and said second pin frame flanges being of a length along said belt means such that on an operative perforation engaging portion of the path of said belt means between said sprocket and said end of said idler means, the flange ends of adjacent assemblies abut one another to maintain the assemblies in alignment and prevent twisting.

4. The tractor mechanism of claim 3, wherein said operative perforation engaging portion of said belt means path is straight and between said sprocket and the curved end of said idler means.

5. The tractor mechanism of claim 3 wherein:

said drive shaft has a non-cylindrical cross-section;

clamping means for securing said drive shaft to said sprocket; said clamping means comprising a plurality of separate clamping pieces, each shaped to have a surface that conforms to a respective part of said profiled exterior of said drive shaft; each said clamping piece being positioned to embrace said drive shaft with its said surface in registry with its respective said portion of said exterior of said drive shaft with which it conforms; adjustable means for securing said clamping pieces to said sprocket to substantially eliminate any play between the rotating elements.

6. The tractor mechanism of claim 1, wherein the radius of said sprocket and the radius of the curved end of said idler means are substantially equal; said idler means peripheral surface extending away from its said curved end and toward said sprocket in a manner such that a pair of spaced linear pathways separated by a distance substantially equal to the diameter of said sprocket is defined; said peripheral surface of said idler means supporting and engaging said belt means.

7. The tractor mechanism of claim 1, wherein said support means on said frame for said idler means is adapted to enable adjustable positioning of said idler means with respect to the position of said sprocket, for obtaining the desired tensioning of said belt means.

8. The tractor mechanism of claim 6, wherein said support means further comprises a projection extending outwardly from said frame; a notch in said idler means slidably engaging said frame projection; said frame projection having elongated sidewalls extending in a direction between said sprocket and said idler means end; said idler means notch having elongated walls engaging said frame projection sidewalls, thereby causing said frame projection to guide shifting of said idler means parallel to said projection side walls.

9. The tractor mechanism of claim 8, wherein said idler means further includes an elongated opening;

said frame having a bushing thereon extending through said elongated opening;

a supporting guide shaft extending through said bushing; said frame being adjustably positionable along said separate guide shaft, means for securing said bushing to said guide shaft for fixing their relative positions.

10. A tractor mechanism for advancing sheet material having spaced apertures therealong; said mechanism comprising:

a. a supporting frame;

b. a drive sprocket; a drive shaft on which said sprocket is mounted and which rotates said sprocket; said shaft being supported on said frame, thereby supporting said sprocket with respect to said frame; said drive shaft being profiled around its exterior for engaging a clamping means;

c. clamping means for embracing said drive shaft and comprising a plurality of separate clamping pieces, each shaped to have a profiled surface portion that conforms to a respective part of said profiled exterior of said drive shaft; each said clamping piece embracing said drive shaft in registry with its respective said portion of said exterior of said drive shaft with which its said profiled surface portion conforms;

d. means adjustably securing said clamping pieces to said sprocket whereby said drive shaft rotates said sprocket without play;

e. idler means spaced from said sprocket; means on said frame for supporting said idler means; said idler means having a substantially U-shaped peripheral edge; the curved end of said idler means being remote from said sprocket, the peripheries of said sprocket and of said idler means collectively defining an oval shaped guide path for a continuous belt means;

f. closed loop belt means entrained about said sprocket and said idler means;

g. a plurality of pins projecting outwardly from said belt for engaging the perforations in sheet material;

h. sprocket engaging elements on said belt; said sprocket periphery having a plurality of spaced grooves whereby rotation of said sprocket advances said elements and said belt.

11. The tractor mechanism of claim 10, wherein said means securing said clamping pieces to said sprocket comprises a bushing surrounding said drive shaft; said bushing having a flange projecting radially outwardly with respect to said drive shaft; said clamping pieces being secured to said bushing flange; said sprocket being secured to said bushing.

12. The tractor mechanism of claim 10, wherein said drive shaft has polygonal shaped cross-section and each said clamping piece profiled surface portion is shaped to conform to a portion of said polygonal cross-section.

13. The tractor mechanism of claim 12, wherein said drive shaft is of square profile and each said clamping piece profiled surface portion is shaped to define a right angle corner notch, with the lengths of the sides of each notch being shorter than the lengths of the sides of the square profile of said drive shaft.

14. A tractor mechanism for advancing sheet material having spaced apertures therealong; said mechanism comprising:

a. a supporting frame;

b. a drive sprocket; a drive shaft on which said sprocket is mounted and which rotates said sprocket; said shaft being supported on said frame, thereby supporting said sprocket with respect to said frame;

c. idler means positioned adjacent said sprocket; means on said frame for supporting said idler means; said idler means having a U-shaped peripheral edge; said sprocket periphery and said idler means peripheral edge cooperatively defining an oval-shaped guide path;

d. closed loop belt means passing around said sprocket periphery and said idler means peripheral edge;

e. sprocket engaging elements on said belt and grooves on said sprocket periphery for engaging said elements, whereby rotation of said sprocket moves said belt and said elements;

f. each of sprocket engaging elements having a pin projecting outwardly from said belt means and towards said paper document and being oriented so as to selectively engage the perforations in sheet material;

g. an elongated belt means support element in that said space, which is positioned to provide a supporting surface against which said belt means can be pressed as it moves past that said space; said belt means support element being positioned inside the enclosed pathway defined by the enclosed said belt means;

h. a plate for engaging said pin frames and pressing said pin frames and said belt means to which said pin frames are attached against its said elongated support element, at the same time thereby squeezing said pin frames between said elongated belt means support element and said plate and preventing motion of said pins toward and away from said elongated belt means support element.

15. The tractor mechanism of claim 14, further comprising:

a door hingedly connected to said frame and positioned such that in a closed position, said door extends over the outside of the projecting said pins, and in an open position, said door permits free access to said pins;

said door having an elongated slot formed therein and positioned to be aligned with said pins when said door is in closed position; said door in said hingedly closed position being located such that said pins project outwardly through said door slot.

16. The tractor mechanism of claim 15, wherein said elongated belt supporting element is connected to and is an extension of said idler means.

17. A tractor mechanism for advancing sheet material that has spaced apertures therealong; said mechanism comprising:

a. a supporting frame;

b. a drive sprocket; a drive shaft on which said sprocket is mounted and which rotates said sprocket; said shaft being supported on said frame, thereby supporting said sprocket with respect to said frame;

c. U-shaped idler means spaced from said sprocket; means on said frame for supporting said idler means; said idler means having a curved end remote from said sprocket; said sprocket periphery and said idler means periphery cooperatively defining a guide path for a closed loop belt means;

d. closed loop belt means passing around the peripheries of said sprocket and said idler means and being moved by said sprocket means;

e. a plurality of pin frames secured to and arrayed along said belt means are each supporting an outwardly projecting pin for engaging a perforation in said sheet material; each said pin frame being individually secured on belt means; each said pin frame including a first upstanding flange extending along one side edge of said belt means and including a second upstanding flange extending along the opposite side edge of said belt means;

f. said first and said second flanges having opposite ends that face toward the flange ends of neighboring pin frame flanges; said first and said second pin frame flanges being of a length along said belt means such that on an operative, perforation engaging portion of the path of said belt means between said sprocket and said end of said idler means, the said pin frame first flange opposite ends of one said pin frame each abut a respective said pin frame first flange end of the neighboring said pin frames, and the said pin frame second flange opposite ends of one said pin frame each abut a respective said pin frame first flange end of the neighboring said pin frames, and the said pin frame second flange opposite ends of one said pin frame each abut a respective said pin frame second flange end of the neighboring said pin frames, to thereby prevent twisting of said pin frames;

g. a pin support arm projecting outwardly with respect to said belt means one edge and from each said first frame flange; an upwardly extending pin affixed on each said pin support arm;

h. said sprocket having a plurality of grooves, said frames each having a sprocket engaging portion on said belt and adapted to be received by a groove on said sprocket periphery, whereby rotation of said sprocket causes movement of said belt and said frames.

18. The tractor mechanism of claim 17, further comprising:

an oval shaped belt supporting surface positioned to provide a supporting surface for said pin support arms;

a plate positioned to engage said pin frames and press said pin frames towards said elongated support element to confine said pin support arms between said elongated belt means support element and said plate.

19. The tractor mechanism of claim 17, wherein said belt means has a plurality of spaced teeth; each of said sprocket engaging elements comprises a respective, tooth receiving groove on a said pin frame and a curved surface opposite said tooth receiving groove for engaging a groove on the sprocket periphery.

20. A pin feed assembly for advancing a paper document having spaced apertures for interengagement with the pin feed assembly which comprises:

first and second spaced parallel frames each having first and second respectively coaxially aligned openings;

an elongated positioning rod extending through the first openings of said first and second frames;

an elongated drive shaft arranged parallel to said positioning rod and extending through the second openings of said first and second frames;

a drive sprocket mounted for rotation upon said drive shaft and having a collar portion extending into the second opening of said first frame, said sprocket being positioned between said first and second frames;

a U-shaped idler positioned between said first and second frames, the curved end being remote from said sprocket and the legs of said idler extending towards said sprocket; said sprocket and said idler collectively defining an oval shaped contour;

closed loop belt means entrained about said idler and said sprocket, said belt means having spaced teeth projecting towards said oval shaped path;

pin frames being secured to said belt means and having a spanning rib with a first grooved surface engaging a tooth and an opposite curved surface;

a pair of flanges arranged on opposite edges of said belt means and being integrally joined to opposite ends of said spanning rib;

a strap connected to said flanges for and cooperating with said flanges and said spanning rib to embrace said belt means;

said flanges extending downwardly from said rib towards said oval-shaped path;

said sprocket having spaced grooves along the periphery thereof for engaging a rib and driving said belt;

said idler having a raised track whereby said downwardly depending flanges slidably engage the periphery of said idler on opposite sides of said track to maintain said frames and said belt means in alignment as said belt means is driven;

said first frame having a projection between said first and second openings and extending towards said second frame;

the legs of said U-shaped idler slidably engaging said projection and being longitudinally adjustable towards or away from said second opening to adjust the tension of said belt means;

means for securing said idler to said second frame;

the straight peripheral portions of said idler providing support for said frames and hence said belt means;

each of said frames having a pin tab extending away from said belt and towards said first frame;

a pin integrally joined to and extending upwardly from said tab and away from said oval shaped path for moving into a perforation in said paper document to provide positive advancement of the document.

21. The pin feed assembly of claim 20, wherein said first frame is provided with an oval-shaped surface adjacent said sprocket and said idler for slidably supporting said tabs.

22. The pin feed assembly of claim 21, further comprising a door hingeably mounted to said second frame and biased towards said second frame to overlie said pins and said belt means;

said door having an elongated slot aligned with said pins to permit said pins to extend through said slot and freely move therealong.

23. The pin feed assembly of claim 22, wherein said hinge assembly comprises a pair of spaced flanges on the hinge end of said door;

a cooperating pair of flanges on said second frame;

each of said door flanges and said second frame flanges having axially aligned openings;

an elongated pin extending through the openings in said door flanges and said second frame flanges from hingedly mounting said door to said second frame;

a biasing spring having a first end secured to said door adjacent one of said door flanges and a second end secured to said second frame adjacent that said one of the second frame flanges closest to said one door flange for biasing said door towards said first frame.

* * * * *

UNITED STATES PATENT OFFICE

CERTIFICATE OF CORRECTION

Patent No. 3,930,601 Dated January 6, 1976

Inventor(s) Yoshihisa Masuda

It is certified that error appears in the above-identified patent and that said Letters Patent are hereby corrected as shown below:

In column 9, line 36 - after "means" please insert --having--

In column 12, line 27 - after "in" (first occurrence) please insert --said--

In column 14, line 14 - after "said" (second occurrence) please insert --raised--

Signed and Sealed this

Sixth Day of July 1976

[SEAL]

*Attest:*

RUTH C. MASON
*Attesting Officer*

C. MARSHALL DANN
*Commissioner of Patents and Trademarks*